United States Patent [19]

Shanley, II

[11] Patent Number: 4,617,587
[45] Date of Patent: Oct. 14, 1986

[54] RECOVERY SYSTEM FOR A CONTROL LOOP

[75] Inventor: Robert L. Shanley, II, Indianapolis, Ind.

[73] Assignee: RCA Corporation, Princeton, N.J.

[21] Appl. No.: 676,944

[22] Filed: Nov. 30, 1984

[51] Int. Cl.$^4$ .............................................. H04N 9/44
[52] U.S. Cl. ...................................... 358/17; 455/265
[58] Field of Search ................... 358/17, 18, 19, 148, 358/158; 455/260, 262, 265, 180; 375/118–120; 331/8, 10, 11, 12, 17, 19, 20

[56] References Cited

U.S. PATENT DOCUMENTS

| | | | |
|---|---|---|---|
| 3,806,668 | 4/1974 | Hilliker | 179/100.4 |
| 3,934,191 | 1/1976 | Garskamp | 455/262 |
| 4,020,500 | 4/1977 | Harwood | 358/19 |
| 4,088,959 | 5/1978 | Sumi | 455/180 |
| 4,266,245 | 5/1981 | Balaban | 358/158 |
| 4,485,354 | 11/1984 | Shanley et al. | 331/8 |
| 4,555,667 | 11/1985 | Cressey | 375/120 |
| 4,569,064 | 2/1986 | Collin | 375/120 |

OTHER PUBLICATIONS

U.S. patent application Ser. No. 666,835 of Shanley, filed 10/31/84.

Primary Examiner—Michael A. Masinick
Attorney, Agent, or Firm—Eugene M. Whitacre; Paul J. Rasmussen; William H. Meagher

[57] ABSTRACT

Non-inverting amplifier, with bandpass filter in regenerative feedback path, forms color reference oscillator in a color TV receiver. Phase shift circuit, responsive to an oscillator output, supplies signals to a first phase shifted signal amplifier, which shares a load with the non-inverting amplifier, and is subject to control by complementary outputs of a phase comparator functioning to compare the phase of an oscillator output with the phase of incoming color synchronizing bursts. A voltage comparator, responsive to the respective phase comparator outputs, is periodically enabled by field rate keying pulses. The voltage comparator output controls the charging or discharging of a capacitor during the keying intervals. A second phase shifted signal amplifier, responsive to the output of the phase shift circuit, and delivering its output to the oscillator's feedback path, is subject to control in dependence upon a comparison of a control voltage derived from the voltage held by the capacitor with a reference DC voltage. A latching circuit, subject to disabling only when receiver's color killer circuit operates in a color unkilling mode, is switched into a first latched mode of operation if voltage held by capacitor reaches a first extreme of its variation range, said first latched mode of operation forcing an unbalance of a first sense upon the voltage comparator inputs. Latching circuit is switched into a second latched mode of operation, forcing an opposite sense unbalance upon the voltage comparator inputs, if voltage held by capacitor reaches opposite extreme of its variation range.

6 Claims, 2 Drawing Figures

RECOVERY SYSTEM FOR A CONTROL LOOP

The present invention relates generally to control loops for use in automatically establishing a desired condition of operation of electrical apparatus, and particularly to a recovery system for use with such a control loop to enable recovery from a failure mode in which a control voltage may be spuriously driven to a control voltage range extreme without establishing the desired operating condition.

An illustrative application of the present invention is its use with a control loop employed to effect color synchronization in a color television receiver.

A conventional approach to color synchronization in color television receivers employs an AFPC control loop to control the frequency and phase of a color reference oscillator from which reference oscillations are derived for use in demodulation of the modulated color subcarrier waves which form the chrominance component of composite color television signals processed by the color TV receiver. In the AFPC control loop, a phase detector compares the phase of an output of a VCO (voltage controlled oscillator) serving as the color reference oscillator with the phase of color synchronizing bursts (the bursts comprising oscillations of color subcarrier frequency and reference phase, which accompany the chrominance component and recur at a line rate) to develop a control voltage for application to the VCO.

Where the free-running frequency of the VCO coincides with the incoming subcarrier frequency, the loop is effective in establishing and maintaining a predetermined (quadrature) phase relationship between the respective inputs to the phase detector. When, however, the free-running frequency of the VCO differs from the incoming subcarrier frequency, the loop functions to alter the VCO's operating frequency so as to match the incoming subcarrier frequency. Under such conditions of altered operating frequency, a static phase error is a normal consequence; i.e., when the conventional AFPC loop is stablized, the phase relationship between the phase detector inputs differs from the desired quadrature phase relationship in accordance with a phase error of a magnitude and sense dependent upon the magnitude and sense of the frequency difference required to be overcome.

In the absence of compensation for the aforementioned static phase error, there will be resultant errors in the coloring of a color image displayed in response to the color-difference signals recovered by the color demodulators of the receiver. While a color television receiver may incorporate a manual control providing a facility external to the AFPC loop for adjusting the phasing of the reference oscillations supplied to the color demodulators, reliance upon a viewers's accurate manual adjustment of such a control is a relatively unsatisfactory solution to the static phase error compensation problem.

My copending U.S. patent application, Ser. No. 668,835, describes an oscillator synchronizing system, suitable for use in a color television receiver, which substantially avoids introduction of a static phase error when effecting synchronization of the oscillator in instances where the oscillator's free-running frequency differs from the frequency of the synchronizing signal.

In the synchronizing system illustrated in said copending patent application, an oscillator, comprising a non-inverting amplifier with a bandpass filter coupled between output and input terminals thereof, is associated with a phase shifter (receiving signals from said oscillator) and a phase comparator. The phase comparator has a first input terminal receiving signals from said oscillator and a second input terminal receiving color synchronizing bursts from the receiver's burst separator, and develops a first control voltage having an amplitude and polarity indicative of the magnitude and sense of any departure from a quadrature phase difference between the respective signals at its input terminals. A phase shifted signal amplifier, responsive to signals from the output terminal of the phase shifter and to the first control voltage, is provided for delivering phase shifted signals to the bandpass filter with an amplitude and polarity dependent upon the amplitude and polarity of the first control voltage.

The phase comparator and the phase shifted signal amplifier cooperate with the local color oscillator to form a phase locked loop, the loop functioning to lock the oscillator frequency and phase to the incoming color synchronizing bursts. When the free-running frequency of the oscillator is equal to the subcarrier frequency of the incoming synchronizing bursts, the loop will stabilize in a condition assuring that the local oscillation input to the phase comparator bears a desired quadrature relationship to the reference phase of the incoming bursts. Under such conditions, accurate phasing of reference oscillations derived from the oscillator for application to the receiver's color demodulators is readily attainable.

However, when the phase locked loop achieves locking in instances where the free-running frequency of the local oscillator is not equal to the subcarrier frequency of the incoming bursts, the loop will have stabilized in a condition appropriate to achievement of an alteration of the oscillator frequency; i.e., in a condition requiring the continued presence of an error voltage DC component in the output of the phase comparator. Thus, the loop stabilizes in a condition in which the local oscillation input to the phase comparator departs from the desired quadrature phase relationship with the reference phase of the incoming bursts, such departure constituting a static phase error. The magnitude and sense of this static phase error is dependent upon the magnitude and sense of the frequency difference required to be overcome. In the absence of compensation, inaccuracy of phasing of the reference oscillations supplied to the color demodulators is a consequence of the static phase error existence, with such inaccuracy translating into hue errors in the displayed color image in color television receivers of the NTSC type (and translating into saturation errors in the displayed color image in color television receivers of the PAL type).

The synchronizing system of said copending patent application, however, does not rely solely upon the above-discussed phase locked loop for control of the local oscillator, but rather includes auxiliary apparatus which can function to substantially eliminate the static phase error and its undesirable consequences.

The auxiliary apparatus of said copending patent application includes a keyed circuit, responsive to the first control voltage developed by the phase comparator, for altering the charge stored by a charge storage capacitor during periodically recurring keying intervals. The charge alteration is effected in a first direction when the first control voltage exhibits a first polarity and in a second direction, opposite to said first direction, when said first control voltage exhibits a second polarity, opposite to said first polarity. The magnitude of charge alteration effected during a keying interval is dependent upon the magnitude of the first control voltage. A second control voltage is derived from the voltage appearing across the charge storage capacitor.

The auxiliary apparatus of said copending patent application also includes a second phase shifted signal amplifier, which is responsive to signals at the output terminal of the previously mentioned phase shifter, and also responsive to control inputs comprising the second control voltage and a reference DC voltage. The second phase shifted signal amplifier supplies to the bandpass filter of the oscillator additional phase shifted signals of a magnitude and polarity dependent upon the magnitude and sense of the difference, if any, between the respective magnitudes of the second control voltage and the reference DC voltage.

The aforementioned keying intervals recur at a field rate, with each keying interval timed to coincide with a portion of the vertical blanking interval of the received signals which encompasses a plurality of successive line intervals. The color synchronizing bursts delivered to the phase comparator are derived from a burst separator responsive to keying pulses normally recurring at a line rate but desirably absent throughout said vertical blanking interval portion.

The manner in which the above-discussed auxiliary apparatus of said copending patent application functions to substantially eliminate the static phase error is subject to explanation below.

For the purposes of the explanation, it is assumed that there exists a difference between the burst subcarrier frequency and the free-running frequency of the oscillator, and that, after a succession of line intervals during which the phase comparator has functioned to compare incoming bursts with the local oscillations, the phase locked loop has achieved lock. The phase comparator output now comprises a first control voltage of a particular polarity and magnitude (representative of the static phase error). During the field rate keying interval following lock attainment, the aforementioned first control voltage appears at the input of the auxiliary keyed circuit, and an alteration of the charge stored by the charge storage capacitor takes place, the sense and magnitude of the alteration being determined by the polarity and magnitude of the first control voltage. The resultant change in the voltage across the charge storage capacitor introduces an imbalance in the control inputs of the second phase shifted signal amplifier. The consequence of the imbalance is injection of phase shifted signals into the oscillator feedback path by the second phase shifted signal amplifier. The imbalance is held throughout the succeeding field.

Following the aforementioned keying interval, the phase locked loop, now destabilized due to the injection by the second phase shifted signal amplifier, seeks anew to attain lock during the line intervals of the succeeding field. When lock is attained under the newly prevailing conditions, the loop will have stabilized with a reduced static phase error. From the point of view of the phase locked loop, the operation of the auxiliary apparatus has effected an adjustment of the free-running frequency of the oscillator in a direction reducing the difference relative to the burst subcarrier frequency.

In the next field rate keying interval, further charge alteration (of lesser magnitude) occurs. From the point of view of the phase locked loop, the operation of the auxiliary apparatus has now effected a further adjustment of the free-running frequency of the oscillator, reducing still further the difference relative to the burst subcarrier frequency. Lock is attained during the succeeding field with a static phase error of further reduced magnitude.

It will be seen from the above, that in a succession of fields, there is a convergence to a condition where the phase locked loop locks up with static phase error substantially completely eliminated. The phase comparator is effectively relieved of the burden of exhibiting an error voltage DC component in its output to sustain an alteration of the oscillator's operating frequency. Instead, the requisite DC component has been effectively stored by the charge storage capacitor of the auxiliary apparatus. The accuracy of the phasing for the reference oscillations to be delivered to the receiver's color demodulators is left undisturbed by the DC component storage in the auxiliary apparatus.

The auxiliary apparatus of the aforementioned copending patent application is also capable of effectively widening the pull-in range of the oscillator synchronizing system relative to that associated with use of the phase locked loop alone. In explanation of this capability, it shall be assumed that the free-running frequency of the oscillator differs sufficiently from the subcarrier frequency of the synchronizing bursts that the pull-in capabilities of the (unaided) phase locked loop are exceeded. In such an instance, even after an entire field interval of recurring burst comparisons, lock will not have been attained. As a residual effect of the many successive comparisons, however, the control voltage output of the phase comparator of the phase locked loop will normally incorporate a DC component of a polarity dependent upon the sense of the frequency difference required to be overcome. When a field rate keying interval next occurs, the effect of this DC component will be an alteration of the charge stored by the charge storage capacitor, an imbalance of the control inputs of the second phase shifted signal amplifier, and a consequent injection of phase shifted signals into the oscillator feedback path by the second phase shifted signal amplifier. From the point of view of the phase locked loop, the effect of such injection, which continues throughout the succeeding field interval, will be equivalent to a shift of the free-running frequency of the oscillator in the direction of the burst subcarrier frequency.

During the succeeding field interval, the phase locked loop is presented with new opportunities to attain lock under more favorable conditions (smaller difference between the adjusted frequency of the oscillator and the incoming burst's subcarrier frequency). If the adjustment has been insufficient to allow the shifted pull-in range to encompass the burst subcarrier frequency, lock will not be attained before the next field-rate keying interval. However, during such field-rate keying interval, a further alteration of the stored charge will take place that results in a further adjustment of the oscillator frequency to further lessen the differences relative to the subcarrier frequency of the bursts. Such frequency adjustments continue until (a) the shifted pull-in range encompasses the burst subcarrier frequency, whereupon lock will be attained during the succeeding field interval, or (b) the second control voltage of the auxiliary apparatus reaches an extreme of its variation range. If instance (a) occurs, the synchronizing system thereafter effects further adjustments in the manner previously described so as to eliminate static phase error.

The pull-in range expansion attributes of the synchronizing system of said copending patent application are sufficiently advantageous that elimination of the usual facility for manual adjustment of the free-running frequency of the color oscillator may be reasonably considered. Examples of several types of such manual adjustment facilities appear, respectively, in U.S. Pat. No. 4,020,500-Harwood (variable filter capacitor) and in U.S. Pat. No. 4,485,354-Shanley, et al. (potentiometer adjustment of phase shifted signal injection into oscillator loop).

One factor that must be weighed in considering whether to forego inclusion of a manual free-running frequency adjustment facility, when employing an oscillator synchronizing system of the type described in said copending patent application, is the existence of a failure mode for said system under certain unusual signal and circuit conditions, in which failure mode advantage cannot be taken of the aforementioned pull-in range expansion effects, wherefore only the pull-in range of the phase locked loop itself is determinative of the frequency difference that can be tolerated for lock attainment (as in conventional color AFPC loops).

Occurrence of the aforementioned failure mode has been observed only in connection with reception of very weak signals. The following is believed to be a correct explanation of the nature of, and reasons for, such failure mode.

It is assumed for purposes of the explanation that the free-running frequency of the oscillator is too low and differs sufficiently from the burst subcarrier frequency that the latter lies outside the pull-in range of the phase locked loop. After an entire field interval of burst comparisons, lock has not been attained. Due to the low level of the weak burst component, the signal-responsive DC component in the comparator output is quite small. If (due, e.g., to manufacturing tolerances) an offset error is associated with the phase comparator (and/or the voltage comparator), and said offset error exists with a magnitude larger than the small signal-responsive DC component and an effective polarity opposite to that of the signal-responsive DC component, the consequence of such a combination will be that the auxiliary control loop is tricked into thinking that the free-running frequency is too high. A frequency adjustment will be effected in the wrong direction, wherefore lock attainment during the succeeding field interval is precluded. The offset error continues to mask the proper polarity of the signal-responsive DC component during subsequent keying intervals, and succeeding frequency adjustments in the wrong direction occur, driving the second control voltage in the wrong direction until it is "hung up" at an extreme of its voltage variation range.

The present invention is directed to apparatus which may be used to enable a control loop, such as the above-described oscillator synchronizing system, to recover from such a failure mode. By augmenting the oscillator synchronizing system of said copending U.S. patent application with recovery apparatus embodying the principles of the present invention, advantage may be taken of the pull-in range expansion attributes of the former even under the unusual signal and offset error conditions associated with the failure mode explanation above, wherefore elimination of the manual free-running frequency adjustment facility may be effected with greater confidence of freedom from adverse effects.

A recovery system in accordance with the present invention is generally applicable to use with a control loop subject to utilization in establishing a desired condition of operation of electrical apparatus, said control loop including a keyed voltage comparator developing a control voltage output within a predetermined range of amplitudes, wherein an unbalance of voltages of one sense at respective input terminals of said voltage comparator introduces a shift of said control voltage output in the direction of a first edge of said predetermined range, whereas an unbalance of the opposite sense introduces a shift of said control voltage output in the direction of the second edge of said range. For recovery from a failure mode in which the control voltage output may be undesirably driven to one of said edges of said range without establishing said desired condition of operation, a latching circuit is provided which is subject to latched operation in a first mode upon sensing of arrival of said control voltage output at said first range edge without establishment of said desired condition of operation, and subject to latched operation in a second mode upon sensing of arrival at said second range edge without establishment of said desired condition of operation. The recovery system further includes means for coupling the latching circuit to the voltage comparator in such manner as to establish an unbalance of said one sense at said input terminals of the voltage comparator when said latching circuit is subject to operation in said second mode, and to establish an unbalance of said opposite sense at said input terminals when said latching circuit is subject to operation in said first mode. The latching circuit is subject to disabling upon establishment of said desired condition of operation.

In accordance with an illustrative embodiment of the present invention, the latching circuit includes first and second transistors of like conductivity type, with a common current source coupled to the emitter electrodes of both transistors, with a first direct current conductive path coupling the collector electrode of said first transistor to the base electrode of said second transistor, with a second direct current conductive path coupling the collector electrode of said second transistor to the base electrode of said first transistor, and with said current source subject to disabling in response to the establishment of said desired operating condition. The latching circuit additionally includes switching means for coupling said control voltage output to one of said base electrodes whenever the amplitude of said control voltage output reaches one of said range edges, and for coupling said control voltage output to the other of said base electrodes whenever the amplitude of said control voltage output reaches the other of said range edges. Illustratively, the coupling means of the recovery system comprises means for direct current conductively coupling each of said collector electrodes to a respectively different one of said comparator input terminals.

In use of the recovery system of the present invention with the previously described color oscillator synchronizing system of said copending U.S. patent application, the first control voltage output of the burst-responsive phase comparator is applied between said input terminals of said keyed voltage comparator, the charge storage capacitor is coupled between an output terminal of said keyed voltage comparator and a point of reference potential, and said keyed voltage comaprator effects alteration of the charge stored by said capacitor during periodically recurring keying intervals. In such use, disabling of the latching circuit is desirably controlled in accordance with an output of the color killer circuit of the color television receiver incorporating the color oscillator being synchronized.

Figure 1:
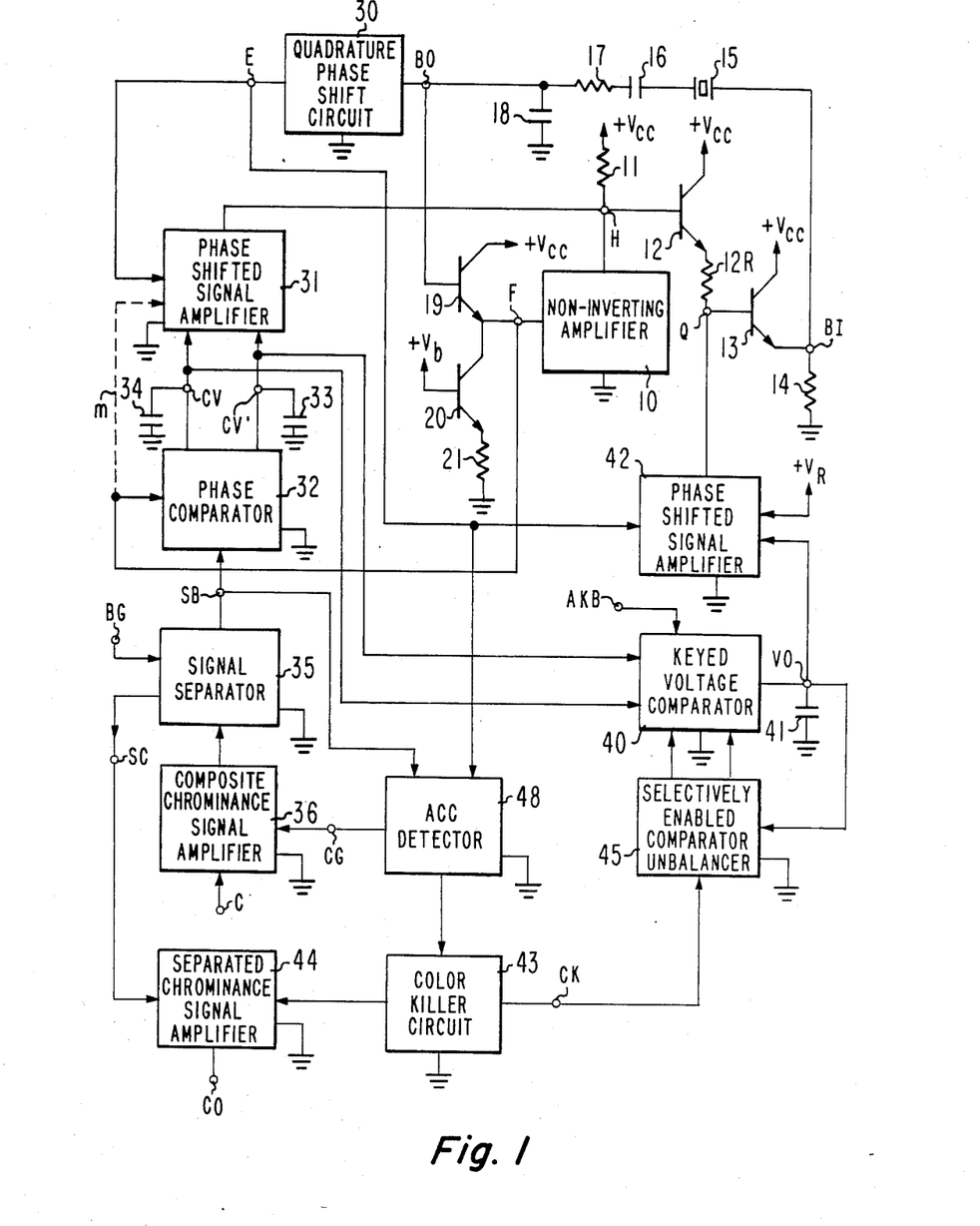
FIG. 1 illustrates, partially schematically and partially by block representation, a portion of a color television receiver employing an oscillator synchronizing system incorporating recovery apparatus in accordance with an embodiment of the present invention.

In the color television receiver portion illustrated in FIG. 1, a non-inverting amplifier 10 is provided with sufficient positive feedback via a bandpass filter linking its output and input terminals to enable it to operate as an oscillator at an operating frequency lying within the filter's passband.

The output of non-inverting amplifier 10 is developed across a load resistor 11, connected between amplifier terminal H and the positive terminal ($+V_{cc}$) of an operating potential supply. Terminal H is coupled to a bandpass filter input terminal BI via a pair of cascaded emitter follower stages (employing respective NPN transistors 12, 13).

Transistor 12 is disposed with its base electrode directly connected to terminal H, with its collector electrode directly connected to the $+V_{cc}$ supply terminal, and with its emitter electrode connected via a resistor 12R to a terminal (Q) directly connected to the base electrode of emitter-follower transistor 13. Transistor 13 has its collector electrode directly connected to the $+V_{cc}$ supply terminal, and its emitter electrode directly connected to the bandpass filter input terminal BI, and returned to the negative terminal (illustratively at ground potential) of the operating potential supply via an emitter resistor 14.

An additional emitter-follower stage (employing NPN transistor 19) serves to couple a bandpass filter output terminal BO to the input terminal (F) of the non-inverting amplifier 10. The base electrode of transistor 19 is directly connected to terminal BO, while its emitter electrode is directly connected to terminal F, and its collector electrode is directly connected to supply terminal $+V_{cc}$. An NPN transistor 20 functions as a current source for the emitter-follower transistor 19. Transistor 20 is disposed with its collector electrode directly connected to terminal F, with its base electrode directly connected to the positive terminal ($+V_b$) of a bias potential supply, and with its emitter electrode returned to ground via an emitter resistor 21.

A regenerative feedback path between the output and input terminals of the non-inverting amplifier 20 is completed by the disposition of a relatively narrowband bandpass filter between the aforementioned filter terminals BI and BO, the band pass filter being formed by the series combination of a piezoelectric crystal 15 and a capacitor 16 disposed in series with a (Q-determining) resistor 17 between terminals BI and BO. The parameters of crystal 15 and capacitor 16 are selected so that these elements exhibit series resonance at (or in the immediate vicinity of) the nominal color subcarrier frequency of the TV signals supplied to the receiver (e.g., 3,579,545 Hz., in the instance of signals of the NTSC type). The resistance value of the resistor 17 is selected to establish a suitable narrow bandwidth (e.g., 1000 Hz.) for the bandpass filter characteristic of the feedback path. A capacitor 18, coupled between terminal BO and ground, cooperates with resistor 17 to provide significant attenuation for harmonics of the desired operation frequency to substantially preclude the sustaining of oscillations at such higher frequencies.

For the purpose of synchronizing the above-described oscillator in frequency and phase with a color subcarrier reference of incoming color television signals, the system of FIG. 1 includes a phase comparator 32. The local input to phase comparator 32 comprises oscillations derived from terminal F at the input of amplifier 10. A composite chrominance signal amplifier 36 is responsive to a composite chrominance signal appearing at terminal C, said composite chrominance signal comprising the chrominance component of incoming signals accompanied by periodic synchronizing bursts of oscillations of color subcarrier frequency and a reference phase. An output of chrominance signal amplifier 36 is supplied to a signal separator 35, which is gated (under the control of burst gating pulses from terminal BG) to deliver separated color synchronizing bursts to the other input (terminal SB) of the phase comparator 32. The separated chrominance component, substantially freed of accompanying bursts, appears at another output (terminal SC) of separator 35.

The separated chrominance component appearing at terminal SC is supplied to a separated chrominance signal amplifier 44, which develops an amplified version of the separated chrominance component at terminal CO for delivery to the color demodulators (not illustrated) of the color television receiver. For conventional automatic chroma control (ACC) purposes, the gain of the composite chrominance signal amplifier 36 is rendered responsive to a gain control voltage developed at terminal CG by an ACC detector 48. ACC detector 48 is advantageously of the synchronous type, responsive to the separated bursts at terminal SB and to local color oscillations derived from the output (terminal E) of phase shift circuit 30. A color killer circuit 43, of conventional purpose, also responds to an output of ACC detector 48 and controls enabling and disabling of the separated chrominance signal amplifier 44. When bursts are present in the incoming signal with a magnitude above a suitable threshold and with a phase locked in synchronism with the local color oscillator output, color killer circuit 43 operates in a color unkilling mode, enabling amplifier 44. Otherwise, color killer circuit operates in a color killing mode, disabling amplifier 44. Reference may be made, for example, to U.S. Pat. No. 3,740,461-Harwood, for an illustration of a configuration suitable for implementing the functions of ACC detector 48.

Phase comparator 32 functions to develop an output indicative of the phase relationship between the respective comparator input signals. Illustratively, phase comparator 32 is of a type developing push-pull outputs, providing complementary control voltages across respective filter capacitors (34, 33) at respective output terminals CV and CV', with the difference between said control voltages having a magnitude and polarity indicative of the magnitude and sense of any departure from a desired quadrature phase relationship which may exist between the respective comparator inputs. Apparatus that may desirably be used for implementing the functions of phase comparator 32 is illustrated, for example, in U.S. Pat. No. 4,229,759-Harwood, et al. Apparatus that may desirably be used for implementing the functions of signal separator 35 is illustrated, for example, in U.S. Pat. No. 4,038,681-Harwood.

The control voltages at terminals CV and CV' are used to control the operation of a phase shifted signal amplifier 31 which shares load resistor 11 with the non-inverting amplifier 10. Signals for application to the signal input terminal of amplifier 31 are derived from the output terminal E of a quadrature phase shift circuit 30, which receives at its input oscillations appearing at the bandpass filter output terminal BO. Illustratively, the parameters of phase shift circuit 30 are such as to subject the oscillations from terminal BO to a phase lag of substantially 90°.

The control of amplifier 31 is such that when a balance between the control voltages at terminals CV and CV' exists (reflecting the presence of a quadrature phase relationship between the respective inputs to comparator 32), amplifier 31 develops no signal output and the free-running operation of the local color oscillator is undisturbed thereby. When a control voltage unbalance of one sense exists (reflecting a departure of a first sense from the desired quadrature relationship between comparator inputs), amplifier 31 develops an inverted version of the phase shifted signals appearing at terminal E across the shared load resistor 11, of a magnitude dependent upon the magnitude of the unbalance. When a control voltage unbalance of the opposite sense exists (reflecting a departure of a second sense from the desired quadrature phase relationship between comparator inputs), amplifier 31 develops a non-inverted version of the phase shifted signals appearing at terminal E across the shared load resistor 11, of a magnitude dependent upon the magnitude of such opposite sense unbalance. The effect of such controlled injection of phase shifted signals is alteration of the oscillator operation in a sense to minimize departure from the desired quadrature phase relationship between the comparator inputs so as to effect synchronization of the oscillator with the received color synchronizing bursts.

As thus far described, the oscillator synchronizing system of FIG. 1 is similar to the system described in U.S. Pat. No. 4,020,500-Harwood. An illustrative configuration, suitable for implementation of the function of the phase shifted signal amplifier 31, is shown in said U.S. patent. Reference may also be made to U.S. Pat. No. 4,485,353-Fang, et al., for a description of a modification of such illustrative configuration, which may alternatively be used, with control symmetrization advantages. In use of such a modification, a matrixing of the phase shifter output with the phase shifter input is desirably employed to develop the signal input for the phase shifted signal amplifier 31. For such matrixing purposes, additional delivery of signals from terminal F (at the input of non-inverting amplifier 10) to amplifier 31 is appropriate, as indicated by the dotted-line connector "m" in FIG. 1.

To address the previously discussed problem of "static phase error" in the operation of the synchronizing system thus far described, the arrangement of FIG. 1 includes additional apparatus: a keyed voltage comparator 40; a charge storage capacitor 41; and an additional phase shifted signal amplifier 42.

The keyed voltage comparator 40 is periodically enabled during keying intervals determined by field rate keying pulses supplied to a keying input of comparator 40 from terminal AKB. The control voltages appearing at terminals CV and CV' are applied as signal inputs to voltage comparator 40. The charge storage capacitor 41 is connected between the comparator's output terminal VO and ground.

In the presence of a difference of one polarity between the respective control voltages at terminals CV, CV' during a keying interval, the charge stored by capacitor 41 is subject to alteration in a first direction, with the magnitude of the charge alteration effected during said keying interval being dependent upon the magnitude of said difference. In the presence of an opposite polarity difference between the respective control voltages at terminals CV, CV' during a keying interval, the charge stored by capacitor 41 is subject to alteration in a second direction, opposite to said first direction, with the magnitude of the charge alteration effected during said keying interval being dependent upon the magnitude of said opposite polarity difference. Between keying intervals, capacitor 41 operates in a "hold" state, retaining its stored charge. In the absence of a difference between the control voltages at terminals CV, CV', i.e., in the presence of control voltage balance, no charge alteration occurs during a keying interval.

The additional phase shifted signal amplifier 42 receives, as a signal input, phase shifted signals from the output terminal E of the quadrature phase shift circuit 30, and, as control inputs, a control voltage responsive to the voltage appearing across capacitor 41, and a reference DC voltage ($+V_R$). In the presence of a balance between the control inputs, no output is developed by the additional phase shifted signal amplifier 42. In the presence of an unbalance of one polarity between the control inputs, amplifier 42 functions to deliver an inverted verison of the phase shifted signals appearing at terminal E to terminal Q (at the base electrode of emitter-follower transistor 13 which delivers signals to the bandpass filter input terminal BI), with a magnitude dependent upon the degree of unbalance. In the presence of an unbalance of the opposite polarity between the control inputs, amplifer 42 functions to deliver a non-inverted version of the phase shifted signals appearing at terminal E to terminal Q, with a magnitude dependent upon the degree of such unbalance.

Illustratively, the timing of the field rate keying pulses supplied to terminal AKB is such that each keying interval for enabling comparator 40 coincides with a post-sync portion of the vertical blanking interval of the received color television signals and encompasses a plurality (e.g., seven) of successive line intervals. Field rate keying pulses of such timing and width are conveniently available, for example, in color television receivers of a type employing automatic control of color kinescope biasing in the manner described in the copending U.S. patent application Ser. No. 434,314 of R. P. Parker. Reference may be made to said copending Parker application, for example, for a description of apparatus suitable for use in generation of such field rate keying pulses.

The timing of the line rate, burst gating pulses supplied to terminal BG of signal separator 35 is such as to coincide with the horizontal blanking interval "back-porch" location of successive color synchronizing bursts. Desirably, however, the nature of the gating pulse train appearing at terminal BG is such that a field rate interruption of gating pulse appearances occurs so that burst gating pulses are absent throughout each period encompassed by the keying pulses appearing at terminal AKB. A burst gating pulse train of such a periodically interrupted character is also conveniently available in certain color television receivers of the above-described type employing automatic control of color kinescope biasing (a receiver of the form described in the RCA Color Television Receiver Basic Service Data booklet denoted 1984 CTC 131 being one example). Reference may be made to the copending U.S. patent application Ser. No. 561,331, of L. Harwood, et al., and the copending U.S. patent application, Ser. No. 561,333, of J. Hettiger, for example, for a description of apparatus serving to develop a gating pulse train of the desired interrupted character.

It will be noted from the description above that the periods of effective operation for phase comparator 32 do not overlap with the periods of enabling for voltage comparator 40. During the vertical blanking interval portion when voltage comparator 40 is enabled by a keying pulse from terminal AKB, the absence of burst gating pulse appearances at terminal BG precludes delivery of a color synchronizing burst input to phase comparator 32. However, during each period of inactivity for voltage comparator 40 which intervenes between successive field rate keying pulses, there are a large number of line intervals in which a synchronizing burst input is supplied for comparison with the local oscillations in phase comparator 32.

As thus far described, the system of FIG. 1 corresponds with the oscillator synchronizing system described in my aforementioned copending U.S. patent application, Ser. No. 666,835. Reference may be made thereto for a showing of an illustrative configuration suitable for implementing the function of the additional phase shifted signal amplifier 42. The manner in which the described system functions to substantially eliminate static phase error is disclosed in detail in said copending U.S. patent application, Ser. No. 666,835, and has been previously described herein.

Additionally, the synchronizing system as thus far described has the capability of effectively expanding the pull-in range of the synchronizing system relative to that obtainable through use of the phase locked loop (31, 32) alone. In instances where the free-running frequency of the oscillator differs sufficiently from the subcarrier frequency of the synchronizing bursts that the pull-in capabilities of the phase locked loop (31, 32) are exceeded, lock will not have been attained even after an entire field interval of recurring burst comparisons. As a residual effect of the many successive comparisons, however, the control voltage output of the phase comparator 32 will normally incorporate a DC component of a polarity dependent upon the sense of the frequency difference required to be overcome. The response of the auxiliary apparatus (40, 41, 42) to such a DC component during a succeeding field rate keying interval will normally be injection of additional phase shifted signals of a sense lessening the frequency difference. That is, from the point of view of the phase locked loop, the operation of the auxiliary apparatus 40, 41, 42 will normally be such as to introduce a succession of adjustments of the free-running frequency of the oscillator, shifting the oscillator's pull-in range in the direction of the subcarrier frequency until lock attainment is feasible.

However, as previously discussed, a departure from such normal operation is possible under certain adverse conditions. Thus, where (a) the subcarrier frequency lies outside the pull-in range of the phase locked loop, and (b) the level of the received bursts is weak, such that the signal responsive DC component in the output of the phase comparator is quite small, and (c) a comparator offset error exists with a magnitude larger than the small signal responsive DC component and an effective polarity opposite to that of the signal responsive DC component, the effect of the operation of the auxiliary apparatus 40, 41, 42 can be a succession of wrong-direction frequency adjustments, leading inevitably to a "hangup" of the output of comparator 40 at one of the edges of its variation range, precluding attainment of the desired synchronization of the oscillator.

For the purposes of recovery from such a failure mode, the system of FIG. 1 additionally includes a selectively enabled comparator unbalancer 45. The function of the comparator unbalancer 45 is to sense the occurrence of an arrival of the output of comparator 40 at an extreme of its variation range without attainment of the desired synchronization, and to respond to the sensing of such occurrence by forcing upon the comparator inputs an unbalance of a sense leading to opposite-direction oscillator frequency adjustments, moving the comparator output in the direction of the opposite edge of its variation range. An input of the comparator unbalancer 45 is coupled to the comparator output terminal VO, rendering the unbalancer 45 responsive to the voltage held by charge storage capacitor 41. Outputs of the unbalancer 45 are coupled to comparator 40 to effect the desired input unbalancing when required. A control input of the unbalancer 45 is coupled to an output terminal CK of the color killer circuit 43 so as to render the unbalancer 45 responsive to the operating mode of the color killer circuit 43 (which provides an indication of attainment, or non-attainment, of the desired oscillator synchronization condition).

If the output of comparator 40 reaches an edge of its variation range without attainment of the desired oscillator synchronization condition, the unbalancer 45 (in an enabled state, due to the condition of the killer output at terminal CK) switches to a state forcing an unbalance (of the inputs of the comparator 40) of a type which leads to alteration of the charge stored by capacitor 41 in a direction retracting the output voltage of comparator 40 from the range edge it has just reached. In the succeeding field rate keying intervals, charge alteration in the new direction continues, shifting the output of comparator 40 in the direction of the opposite range edge. A facility is thus provided for recovery from the above described failure mode in which a frequency adjustment in the wrong direction had proceeded to the limit. From the point of view of the phase locked loop, the recovery apparatus effectively functions to "sweep" the oscillator's free-running frequency in discrete steps from a remote range edge frequency in a direction lessening the difference between oscillator frequency and subcarrier frequency. This sweep capability permits recovery from the consequences of a "wrong-direction" start; the subsequent "right-direction" sweep continues until the shifted pull-in range of the oscillator encompasses the subcarrier frequency, allowing lock to be attained by the phase locked loop (31, 32) during the burst comparisons of the succeeding field interval. Disabling of the unbalancer 45 in response to an unkilling mode of the color killer circuit 43 will ensue. The synchronizing system thereafter effects further adjustments in the manner previously described so as to eliminate static phase error.

If the frequency difference is so large as to exceed even the effectively expanded pull-in capabilities of the described system, the recovery apparatus will continue to sweep the oscillator frequency across its entire frequency variation range in alternately opposite directions, ceaselessly endeavoring to establish conditions amenable to lock attainment.

Figure 2:
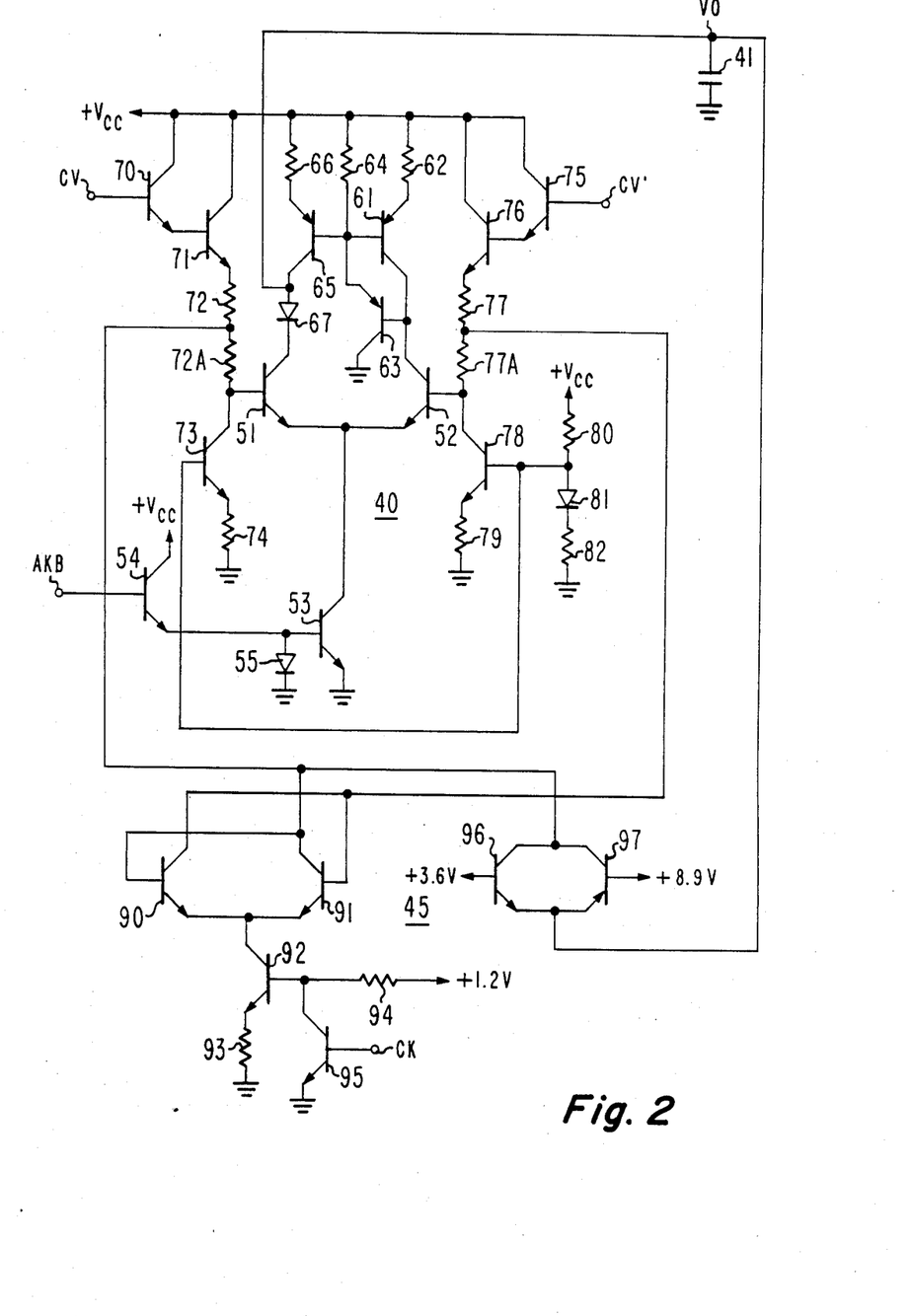
FIG. 2 illustrates schematically circuitry which may be employed advantageously in implementing selected functions of the oscillator synchronizing sytem of FIG. 1.

FIG. 2 provides a schematic showing of circuit arrangements which may be advantageously employed to implement the functions of the keyed voltage comparator 40 and the selectively enabled comparator unbalancer 45 of the system of FIG. 1.

In FIG. 2, the comparator 40 comprises a differential amplifier employing a pair of NPN transistors 51, 52 with interconnected emitter electrodes connected to the collector electrode of an NPN current source transistor 53. A diode 55, with its anode connected to the base electrode of transistor 53 and its cathode grounded, shunts the base-emitter path of the current source transistor 53. The coupling of field rate keying pulses (of positive-going nature) to the base electrode of transistor 53 to periodically enable the comparator 40 is effected via the base-emitter path of NPN emitter-follower transistor 54, disposed with its collector electrode directly connected to the $+V_{cc}$ supply terminal, and with its base electrode directly connected to the keying pulse input terminal AKB.

The control voltage appearing at the phase comparator output terminal CV is coupled to the base electrode of the differential amplifier transistor 51 via an emitter-follower stage employing NPN transistor 70, in cascade with a level shifting stage incorporating an NPN emitter-follower transistor 71 and a pair of series-connected dropping resistors, 72, 72A. Transistor 70 is disposed with its collector electrode directly connected to the $+V_{cc}$ supply terminal, with its base electrode directly connected to terminal CV, and with its emitter electrode directly connected to the base electrode of transistor 71. Transistor 71 is disposed with its collector electrode directly connected to the $+V_{cc}$ supply terminal, and with its emitter electrode connected via the series combination of resistors 72 and 72A to the base electrode of amplifier transistor 51. An NPN transistor 73 serves as a current source for the level shifting stage, with the collector electrode of transistor 73 directly connected to the base electrode of transistor 51, and with the emitter electrode of transistor 73 returned to ground via an emitter resistor 74.

Similarly, the control voltage appearing at the phase comparator output terminal CV' is coupled to the base electrode of the differential amplifier transistor 52 via an emitter-follower stage employing NPN transistor 75, in cascade with a level shifting stage incorporating an NPN emitter-follower transistor 76 and a pair of series-connected dropping resistors 77, 77A. Transistor 75 is disposed with its collector electrode directly connected to the $+V_{cc}$ supply terminal, with its base electrode directly connected to terminal CV', and with its emitter electrode directly connected to the base electrode of transistor 76. Transistor 76 is disposed with its collector electrode directly connected to the $+V_{cc}$ supply terminal, and with its emitter electrode connected via the series combination of resistors 77 and 77A to the base electrode of differential amplifier transistor 52. An NPN transistor 78 serves as a current source for the level shifting stage, with the collector electrode of transistor 78 directly connected to the base electrode of transistor 52, and with the emitter electrode of transistor 78 returned to ground via an emitter resistor 79.

The anode of a diode 81 is connected via a resistor 80 to the $+V_{cc}$ supply terminal, while the cathode of diode 81 is returned to ground via a resistor 82. The elements 80, 81, 82 form a voltage divider across the operating potential supply, with the divider output, at the anode of diode 81, supplied as a bias voltage to the base electrodes of the aforementioned current source transistors 73, 78.

The collector current of the differential amplifier transistor 52 serves as the input current to a current mirror arrangement employing PNP transistors 61,63,65. Transistor 61 is disposed with its emitter electrode returned to the $+V_{cc}$ supply terminal via an emitter resistor 62, and with its collector electrode directly connected to the collector electrode of amplifier transistor 52 and to the base electrode of transistor 63. The collector electrode of transistor 63 is grounded, while the emitter electrode of transistor 63 is directly connected to the base electrode of transistor 61, and connected via a resistor 64 to the $+V_{cc}$ supply terminal. Transistor 65, which serves as the output transistor of the current mirror arrangement, is disposed with its base electrode directly connected to the base electrode of transistor 61, with its emitter electrode returned to the $+V_{cc}$ supply terminal via an emitter resistor 66, and with its collector electrode connected via diode 67 to the collector electrode of amplifier transistor 51. The poling of the linking diode 67 is such that its anode is connected to the collector electrode of transistor 65.

The voltage comparator outut terminal VO is directly connected to the collector electrode of transistor 65. The voltage comparator's output storage capacitor 41 is coupled between terminal VO and ground. When a difference between the control voltages at terminals CV, CV' exists (during a keying interval) of such a nature that the potential at the base electrode of transistor 52 is more positive than the potential at the base electrode of transistor 51, then the collector current of transistor 65 (mirroring the collector current of amplifier transistor 52) exceeds the collector current drawn by amplifier transistor 51. The excess flows as a charging current for capacitor 41 during such a keying interval, resulting in an elevation (in the positive direction) of the potential at terminal VO. The potential at terminal VO is held at the elevated level throughout the succeeding field.

In contrast, when a difference between the control voltages at terminals CV, CV' exists (during a keying interval) of such a nature that the potential at the base electrode of transistor 51 is more positive than the potential at the base electrode of transistor 52, then the current supplied by the mirror output transistor 65 is insufficient to meet the demand for current by amplifier transistor 51. The deficiency is remedied by the drawing of a discharging current from capacitor 41 during such a keying interval, resulting in a depression of the potential at terminal VO. The potential at terminal VO is held at the depressed level throughout the succeeding field.

The comparator unbalancer 45 of FIG. 2 includes a pair of NPN transistors 90, 91 with interconnected emitter electrodes connected to a common current source. NPN transistor 92 serves as the current source, and is disposed with its collector electrode directly connected to the interconnected emitter electrodes of transistors 90 and 92, with its emitter electrode returned to ground via an emitter resistor 93, and with its base electrode connected via a resistor 94 to the positive terminal (+1.2 V) of a bias potential supply.

Enabling or disabling of the current source transistor 92 is effected under the control of an NPN transistor 95. Control transistor 95 is disposed with its collector electrode directly connected to the base electrode of current source transistor 92, with its emitter electrode directly grounded, and with its base electrode directly connected to terminal CK (of the color killer circuit 43 of the FIG. 1 system). When the color circuit 43 is in its color unkilling mode (indicating attainment of oscillator synchronization), terminal CK swings positive a sufficient amount to render control transistor 95 conducting to a degree effecting a cut-off of transistor 92. Under such cut-off conditions, the comparator unbalancer 45 is disabled. When color killer circuit 43 is in its color killing mode, the potential at terminal CK is sufficiently depressed to preclude conduction by control transistor 95. Under such circumstances, the current source transistor 92 is enabled.

The collector electrode of transistor 90 is directly connected to the base electrode of transistor 91, and is also directly connected to the junction of the series-connected dropping resistors 77,77A of comparator 40. The collector electrode of transistor 91 is directly connected to the base electrode of transistor 90, and is also directly connected to the junction of the series-connected dropping resistors 72,72A of comparator 40. The nature of the interconnections between the transistors 90 and 91 is such that they cooperate to form a latching circuit.

The comparator unbalancer 45 of FIG. 2 additionally includes a switching section serving to selectively connect comparator output terminal VO to the base electrode of transistor 90 in instances when the voltage across storage capacitor 41 reaches an extreme of its variation range. The switching section includes an NPN switching transistor 96 and a PNP switching transistor 97. Each of the switching transistors 96, 97 is disposed with its emitter electrode directly connected to terminal VO, and with its collector electrode directly connected to the base electrode of transistor 90. The base electrode of NPN switching transistor 96 is directly connected to the positive terminal (+3.6 V) of a first switch reference potential supply, while the base electrode of the PNP switching transistor 97 is directly connected to the positive terminal (+8.9 V) of a second switch reference potential supply.

For an explanation of how the circuitry illustrated for unbalancer 45 in FIG. 2 operates to effect recovery from a failure mode of the previously discussed type, let it first be assumed that comparator 40 has been "tricked" into driving the voltage at terminal VO toward the more positive extreme of its variation range, with the undesirable consequences of increasing the difference between oscillator frequency and subcarrier and precluding lock attainment by the phase locked loop. When the voltage at terminal VO reaches a level (e.g., approximately 9.5 volts) sufficiently positive relative to the second switch reference potential to turn on switch transistor 97, the potential at the base electrode of transistor 90 is elevated relative to the potential at the base electrode of transistor 91, and the latching circuit 90, 91, 92 is switched into an operating mode in which transistor 91 is cut off and the current supplied by transistor 92 is passed solely by conducting transistor 90.

The resultant increase in the voltage drop across resistor 77 lowers the potential at the base electrode of comparator transistor 52 relative to the potential at the base electrode of comparator transistor 51. The potential depression is of sufficient magnitude to force an unbalance of the comparator inputs of a sense causing the collector current of comparator transistor 51 to exceed the collector current of transistor 65 (which mirrors the collector current of comparator transistor 52) during a keying period of enablement for comparator 40. In the presence of an unbalance of this sense, the charge alteration occurs with a discharging sense, lowering the voltage at terminal VO.

During the succeeding field rate keying intervals, incremental drops in the voltage at terminal VO occur. The described operating mode persists despite a turnoff of the switching transistor 97, as the interconnections between transistors 90 and 91 are such as to latch the circuit 90,91,92 in the existing mode of operation. When the resultant sweep of the voltage at terminal VO depresses it to a level enabling the pull-in range of the phase locked loop (31,32) to encompass the subcarrier frequency, lock is ultimately attained. A consequent shift of the color killer circuit (43) to its color unkilling mode elevates the potential at terminal CK to turn on transistor 95 and thereby disable the latching circuit 90,91,92. The system of FIG. 1 thereafter operates in a manner previously described to eliminate static phase error.

A similar technique for recovery exists should the comparator 40 be "tricked" into spuriously driving the voltage at terminal VO toward the less positive extreme of its variation range. In this instance, when the voltage at terminal VO reaches a level (e.g., approximately 3.0 volts) sufficiently negative relative to the first switch reference potential to turn on switch transistor 96, the potential at the base electrode of transistor 90 is depressed relative to the potential at the base electrode of transistor 91, and the latching circuit is switched into an operating mode in which transistor 90 is cut off and the current supplied by transistor 92 is passed solely by conducting transistor 91. Under such circumstances, the unbalance forced on the comparator inputs is of a sense causing the collector current of transistor 65 (mirroring the collector current of comparator transistor 52) to exceed the collector current of comparator transistor 51 during a keying period of enablement. Charge alteration now occurs with a charging sense. During the succeeding field rate keying intervals, incremental increases in the voltage at terminal VO occur, and the recovery "sweep" is in the positive direction.

In an illustrative implementation of the circuit arrangement of FIG. 2 (with values of 1500 ohms for resistors 72 and 77; 8500 ohms for resistors 72A and 77A; 10,000 ohms for resistor 94; 5000 ohms for resistor 93; one microfarad for capacitor 41; with transistors 73 and 78 serving as respective 0.415 milliampere current sources; and with transistor 53 serving as a 0.25 milliampere current source, when enabled), approximately 60 field rate keying intervals are required to complete a sweep of the voltage at terminal VO from one range extreme to the other.

What is claimed is:

1. In a control loop including a keyed voltage comparator developing a control voltage output within a predetermined range of amplitudes, said control voltage being subject to utilization in establishing a desired condition of operation of electrical apparatus, wherein an unbalance of voltages of one sense at respective input terminals of said voltage comparator introduces a shift of said control voltage output in the direction of a first edge of said predetermined range whereas an unbalance of voltages at said input terminals of the opposite sense introduces a shift of said control voltage output in the direction of the second edge of said range; said control loop being undesirably subject to a failure mode in which the control voltage output may be driven to one of said edges of said predetermined range without establishing said desired condition of operation; a system for achieving a recovery from said failure mode comprising:
- a latching circuit subject to latched operation in a first mode upon sensing of arrival of said control voltage output at said first range edge without establishment of said desired condition of operation, and subject to latched operation in a second mode upon sensing of arrival of said control voltage output at said second range edge without establishment of said desired condition of operation; and
- means for coupling said latching circuit to said voltage comparator in such manner that an unbalance of said one sense is established at said input terminals of said voltage comparator when said latching circuit is subject to operation in said second mode, whereas an unbalance of said opposite sense is established at said input terminals when said latching circuit is subject to operation in said first mode; and
- wherein said latching circuit is subject to disabling upon establishment of said desired condition of operation.

2. A system in accordance with claim 1 wherein said latching circuit includes:
- first and second transistors of like conductivity type, each having base, emitter and collector electrodes;
- a common current source coupled to the emitter electrodes of said first and second transistors;
- a first direct current conductive path coupling the collector electrode of said first transistor to the base electrode of said second transistor; and
- a second direct current conductive path coupling the collector electrode of said second transistor to the base electrode of said first transistor;
- wherein said current source is subject to disabling in response to the establishment of said desired operating condition.

3. A system in accordance with claim 1 wherein said latching circuit also includes switching means for coupling said control voltage output to one of said base electrodes whenever the amplitude of said control voltage output reaches one of said range edges.

4. A system in accordance with claim 3 wherein said coupling means comprises means for direct current conductively coupling each of said collector electrodes to a respectively different one of said comparator input terminals.

5. A system in accordance with claims 1 or 4 for use in a color television signal processor wherein said electrical apparatus comprises a color reference oscillator including a non-inverting amplifier, and a regenerative feedback path inclusive of a bandpass filter coupled between an output and an input of said amplifier; wherein said control loop functions to effect synchronization of the frequency and phase of an output of said oscillator with color synchronizing bursts incorporated in the color television signal being processed; said control loop including
- a phase shifter having an input terminal coupled to receive signals from said oscillator and having an output terminal;
- a phase comparator, having a first input terminal coupled to receive signals from said oscillator and a second input terminal coupled to receive said color synchronizing bursts, said phase comparator developing a first control voltage having an amplitude and polarity indicative of the magnitude and sense of any departure from a quadrature phase difference between the respective signals appearing at its input terminals;
- first controlled means, responsive to signals appearing at said phase shifter output terminal and to said first control voltage; for delivering phase shifted signals to said bandpass filter with an amplitude and polarity dependent upon the amplitude and polarity of said first control voltage;
- a charge storage capacitor; and
- second controlled means, independent of said first controlled means, and responsive to signals appearing at said phase shifter output terminal, to a second control voltage derived from the voltage appearing across said charge storage capacitor, and to a reference DC voltage, for supplying to said bandpass filter additional phase shifted signals of a magnitude and polarity dependent upon the magnitude and sense of the difference, if any between the respective magnitudes of said second control voltage and said reference DC voltage; and
- wherein said first control voltage is applied between said input terminals of said keyed voltage comparator, said charge storage capacitor is coupled between an output terminal of said keyed voltage comparator and a point of reference potential, and said keyed voltage comparator effects alteration of the charge stored by said capacitor in a first direction when said first control voltage exhibits a first polarity and in a second direction, opposite to said first direction, when said first control voltage exhibits a second polarity, during periodically recurring keying intervals; the magnitude of the charge alteration effected during a keying interval being dependent upon the magnitude of said first control voltage.

6. A system in accordance with claim 5, wherein said color signal processor includes an ACC detector responsive to phase shifted signals from the output terminal of said phase shifter and to said color synchronizing bursts, and a color killer circuit responsive to an output of said second phase comparator, and wherein disabling of said latching circuit is controlled in accordance with an output of said color killer circuit.

* * * * *